United States Patent [19]

Bullock et al.

[11] Patent Number: 5,070,404
[45] Date of Patent: Dec. 3, 1991

[54] METHOD AND APPARATUS FOR CONTEMPORANEOUS DELIVERY OF DATA

[75] Inventors: Wayne J. Bullock, Paoli, Pa.; H. Edward Gordon, Palmdale, Calif.

[73] Assignee: Bullock Communications, Inc., Malvern, Pa.

[21] Appl. No.: 523,623

[22] Filed: May 15, 1990

[51] Int. Cl.⁵ .................... H04N 7/08; H04N 7/04
[52] U.S. Cl. .................................. 358/142; 358/146; 358/147; 455/45
[58] Field of Search ............... 358/142, 146, 147, 143, 358/903, 145, 434, 437, 469; 455/3, 45

[56] References Cited

U.S. PATENT DOCUMENTS

| | | | |
|---|---|---|---|
| 3,848,082 | 11/1974 | Summers | 358/146 |
| 4,148,066 | 4/1979 | Saylor | 358/127 |
| 4,237,486 | 12/1980 | Shimp | 358/142 |
| 4,379,947 | 4/1983 | Warner | 455/45 |
| 4,635,132 | 1/1987 | Nakamura | 358/296 |
| 4,658,294 | 4/1987 | Park | 358/142 |

OTHER PUBLICATIONS

"The Data-Dot System", by George D. Summers, Signal, vol. 29, No. 4, pp. 35-42, 1/1975.

Primary Examiner—James J. Groody
Assistant Examiner—Safet Metjahic
Attorney, Agent, or Firm—Panitch Schwarze Jacobs & Nadel

[57] ABSTRACT

A method and system for the contemporaneous delivery of data from a first location to a user at a remote location utilizes standard broadcast facilities as the transmission medium. The data and an identifier uniquely associated with the data are encoded and transmitted along with a first standard broadcast signal. An enabling cue signal corresponding to the identifier is encoded and transmitted along with a second standard broadcast signal. The first broadcast signal is received and demodulated at the user location, the identifier is decoded and the encoded data is stored in a memory location uniquely associated with the identifier. The second standard broadcast signal is also received and demodulated at the user location and is decoded to provide the cue signal. The cue signal is compared with the received identifier and if the comparison is positive the stored encoded data is recalled from the memory, decoded and printed at the discretion of the user.

9 Claims, 2 Drawing Sheets

METHOD AND APPARATUS FOR CONTEMPORANEOUS DELIVERY OF DATA

BACKGROUND OF THE INVENTION

The present invention relates generally to a method and apparatus for the contemporaneous delivery of data and, more particularly, to such a method and apparatus which employs an existing transmission medium for the delivery of the data and which includes means for providing a printed or hard copy of the delivered data.

In the past, numerous methods have been employed for the contemporaneous delivery of data, particularly printed or hard copy data, from one location to another. The most prominent prior art method involves point-to-point facsimile transmission from a single transmitter location to a singe receiver location, generally over a telephone, or similar hard wire line or facility. With such existing facsimile or fax systems, the receiving fax machine automatically prints a hard copy of whatever information is received with no control or selectivity on the part of a fax machine user.

A need has developed for a system to permit the simultaneous transmission of information or data from a single source location to multiple receiving locations in order to facilitate efficient widespread contemporaneous dissemination of the information. Such a system is particularly desirable for use in transmitting large amounts of information and/or data and which permits a user at the receiving location to obtain a printed or other form of hard copy only of selected portions of the received information or data.

The present invention comprises a method and apparatus for the contemporaneous delivery of information and/or data, preferably in ASCII form or some other readily codable form, over an existing transmission system such as a standard television or radio broadcasting system. The information or data could be transmitted "live" or it could be prerecorded as could the television or radio broadcast. With the method and apparatus of the present invention all of the information and/or data is preferably transmitted on a subcarrier frequency of a standard radio or television broadcast transmission signal. At the receiver location, the transmitted information and/or data is separated from the rest of the standard broadcast signal and is stored in a memory device for selective printing of a hard copy upon receipt of a cue signal.

SUMMARY OF THE INVENTION

Briefly stated, the present invention comprises a method and apparatus for contemporaneous delivery of data from a first location to a user at a remote location utilizing standard broadcast facilities. Means are provided at a first location for receiving the data and an identifier uniquely associated with the data and for encoding the data and identifier into a data packet for transmission along with a first standard broadcast signal. Means are provided for generating an enabling cue signal corresponding to the identifier and for encoding the cue signal for transmission along with a second standard broadcast signal. Means are provided at the user location for receiving and demodulating the first broadcast signal, for decoding the identifier and for storing received encoded data in a memory location uniquely associated with the identifier. Means are provided at the user location cooperating with a standard broadcast receiver for receiving the demodulated second broadcast signal and for decoding the received signal to provide the cue signal. Also at the user location are means for receiving the cue signal, for determining the presence of stored data having an identifier corresponding to the cue signal and for providing an indication to the user of the presence of the stored data. The user location also includes means for selectively decoding and printing the stored data upon actuation by the user.

BRIEF DESCRIPTION OF THE DRAWINGS

The foregoing summary, as well as the following detailed description of a presently preferred embodiment of the invention, will be better understood when read in conjunction with the appended drawings. For the purpose of illustrating the invention, there is shown in the drawings an embodiment which is presently preferred. It should be understood, however, that the present invention is not limited to the particular arrangement and instrumentalities shown. In the drawings.

DESCRIPTION OF PREFERRED EMBODIMENT

Figure 1:
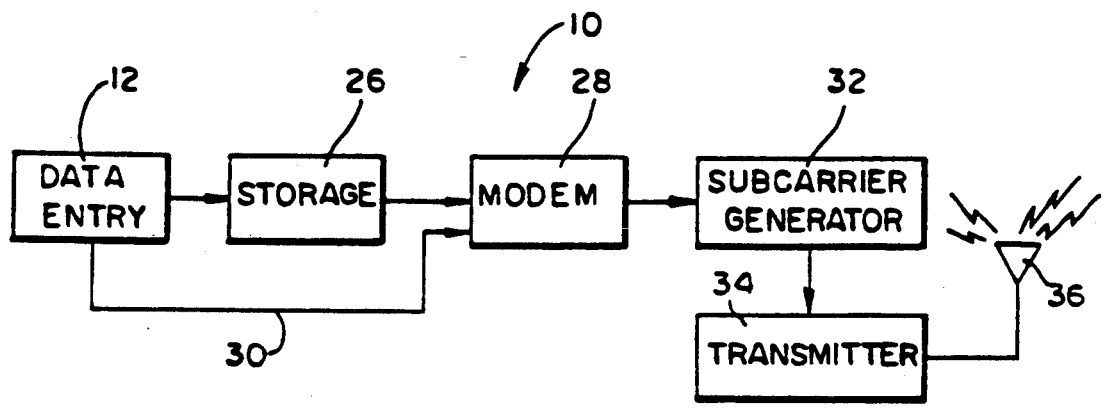
FIG. 1 is a functional block diagram of the data entry and transmission portion of a data delivery system in accordance with the present invention.

The presently preferred embodiment of the invention described below relates to a method and apparatus for the transmission of information and/or data (hereinafter referred to as "data") in the form of standard coupons redeemable in the usual manner in connection with the purchase of goods and/or services, the coupons being transmitted directly to the home of a user on a subcarrier frequency of a standard FM radio or television broadcast signal. In general, in the disclosed embodiment, the coupon data is encoded and then transmitted on the FM subcarrier in the usual manner and is received and stored in the manner described below. Upon receipt of an enabling or cue signal, in the preferred embodiment in the form of a DTMF tone, broadcast with a standard TV or other commercial relating to the particular data, the data may be selectively printed by a user. Thus, for example, with the present embodiment, data pertaining to a coupon for money off of the purchase price of a product, such as a particular detergent, is periodically transmitted on an FM radio subcarrier and is received, decoded and stored by a receiver at the home of a user until the proper cue signal is transmitted along with a television commercial for the particular detergent. Similarly, data pertaining to a coupon for reduced admission to a particular form of entertainment, such as a wrestling match, is broadcast on an FM radio subcarrier and is stored and may be printed upon the receipt of a cue signal transmitted along with a commercial pertaining to the wrestling match. It will be appreciated by those skilled in the art that while the following description pertains to a preferred method and apparatus for the broadcast of such coupon data over an FM subcarrier for use in conjunction with a cue signal transmitted with a corresponding commercial message over an existing standard television broadcast signal, the same system could be employed for the transmission of other than coupon data, such as sports scores, traffic information, news, weather information, school information, jokes, financial information, etc. and that the data could be transmitted continuously, periodically and/or at times other than during a corresponding television commercial. For example, detailed sports score data may be transmitted either before, during or after the sports portion of a television news show during which appropriate cue signals are transmitted. In addition, it should be appreciated by those skilled in the art that such data or information could be transmitted in conjunction with a television broadcast signal utilizing different methods or apparatus. Similarly, it should be appreciated that, in the alternative, coupons and/or other data, as well as the enabling or cue signals, may be transmitted utilizing some other transmission system, such as a satellite signal, cable broadcast, etc.

The method and apparatus of the preferred embodiment of the present invention employs a first means, usually located proximate a radio or television studio or transmitter for encoding and transmitting the coupon data on a subcarrier of a standard FM radio broadcast signal and a second means, usually located proximate a television receiver in the home, office or other facility of a user, for receiving and decoding the data and, after receiving an enabling or cue signal, for selectively printing a hard copy of the coupon.

FIG. 1 is a block diagram illustrating the primary functional components of the first means, hereinafter referred to as the data entry and transmission system 10. The principal component of the data entry and transmission system 10 is a data entry means or data entry device 12.

It should be appreciated by those skilled in the art that a primary purpose of the data entry device 12 is to obtain the data to be printed on the coupon and to place the data in encoded form for transmission on a subcarrier of a standard FM broadcast signal. In the present embodiment, the data is preferably encoded into a standard ASCII format and is then packetized into standard sized eight bit words or packets, the first bit of each word being employed as an identification code and the following seven bits of each word containing the encoded coupon data to be transmitted. In general, the identification bit or code relates to the particular subject matter of the coupon data being encoded and is employed to facilitate proper storage and later recall of the particular coupon data at an appropriate time, both at the transmission end and, more importantly, by the user at the receiver end.

Because of the time involved in transmitting all of the data necessary for the printing of a complete standard coupon, it has been determined that, in some situations, in addition to the use of a high speed data link, some of the coupon data may require further encoding or compacting. It is well known that most coupons contain certain standardized information, for example, information pertaining to the specifics of the terms and conditions for redemption. Such standard information may be compacted or further encoded utilizing, for example, a standard table-lookup coding technique, although other data compaction or encoding techniques could be used. Thus, for example, a single eight bit word comprised of a first identification bit and seven data bits could be employed as a code for the transmission of an entire sentence or even an entire paragraph of a standard coupon, such as the standard redemption information. Other standard portions of the coupon, such as the amount of money being discounted, the expiration date, etc., can be similarly compacted or encoded.

Figure 2:
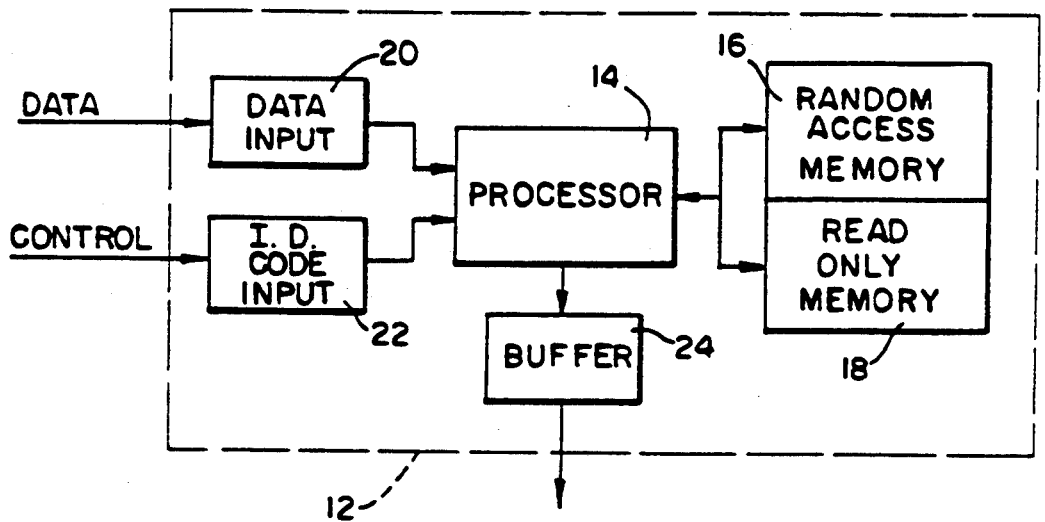
FIG. 2 is a more detailed functional block diagram of the data entry portion of the system shown in FIG. 1.

FIG. 2 is a more detailed functional block diagram illustrating the structure and operation of the presently preferred data entry device 12. The data entry device 12 shown in FIG. 2 is a standard personal computer such as an IBM Model AT, or other computer-based system which includes a CPU or processor 14, such as a microprocessor, a memory module including both random access memory or RAM 16, and some form of non-volatile or read only memory (ROM) or programmable read only memory (PROM) 18, both of which are in communication with the processor 14, either directly or along a standard memory bus. A computer program for controlling the operation of the data entry device 12 is stored in the read only memory 18. The data entry device 12 further includes input means in the form of a data input means 20 and an identification code input means 22. The data input means 20 may comprise a standard ASCII keyboard of the type normally associated with a personal computer, an optical scanner, a magnetic card or tape reader, or any other suitable type of apparatus employed for inputting textual coupon data in ASCII format to the processor 14. The identification code input means 22 may comprise a similar type of component. While, in the embodiment shown in FIG. 2, the data input means 20 and the identification input means 22 are shown as separate components, it should be appreciated by those skilled in the art that both of these functions could be performed by a single component, such as a standard ASCII keyboard (not shown). A complete description of the structure and operation of the data entry device is not necessary for an understanding of the present invention and may be obtained from the manufacturer.

In operation of the data entry device 12, the coupon data and the appropriate identification code or codes are input into the data entry device 12 utilizing the data and identification code input means 20 and 22. The data is received by the processor 14 and, if appropriate, is compacted or otherwise encoded and is stored in a particular location in the random access memory 16. When all of the data necessary for a complete coupon has been compacted/encoded and stored in the memory 16, the complete coupon data is ready for transmission. If desired, an output buffer 24 may be employed to further facilitate data storage and transmission.

Referring again to FIG. 1, the complete coupon data is released at the appropriate time by the data entry device 12 through the buffer 24 as shown, or directly (not shown) to a storage device, such as a broadcast wheel 26. A broadcast wheel is a device well known in the broadcast art and commercially available from International Data Casting Corp. The broadcast wheel 26 receives and stores a plurality of data or messages in a certain sequence. The messages or data are then transmitted in a predetermined sequence, generally on a continuous or repeated basis. Thus, for example, if thirty messages or data packets are stored in a broadcast wheel 26 with each having a duration of thirty seconds, then each message is transmitted once every fifteen minutes if the broadcast wheel is continuously transmitting. A complete description of the structure and operation of the broadcast wheel is not necessary for a complete understanding of the present invention and, in any event, is available from the manufacturer.

The messages or data packets from the broadcast wheel 26 are fed to the input of a modem 28. In the presently preferred embodiment, the modem 28 employs standard frequency shift keying (FSK) to convert the data from the broadcast wheel 26 to a stream or a series of audio frequency tones. Alternatively, the data from the data entry device 12 may be fed directly to the modem 28 along line 30 in order to permit the broadcast of real time or near real time data. Preferably, the modem 28 is of the high speed type, for example, 9600 baud. In the present embodiment, the modem 28 is commercially available from many manufacturers, including Hayes and AT&T. A detailed description of the structure and operation of the modem 28 is not necessary for a complete understanding of the present invention and may be obtained from the manufacturer.

The output FSK tones from the modem 28 are applied to the input of a subcarrier generator 32. The subcarrier generator 32 is of a type which is generally well known in the art and commercially available from many manufacturers, including Harris and Wegener Communications. The subcarrier generator 32 obtains the FSK tones from the modem 28 and modulates the tones into a form for suitable transmission on an FM carrier. Complete details of the structure and operation of the subcarrier generator 32 are not necessary for an understanding of the present invention but are available from the manufacturer.

The output of the subcarrier generator 32 is applied in a manner well known in the art to a standard transmitter 34, preferably an FM transmitter, also well known in the art and generally commercially available. It is presently preferred that the FM transmitter 34 be an existing standard FM radio transmitter associated with a particular radio station. The addition of the subcarrier information onto the standard FM radio broadcast does not adversely affect the standard FM broadcast signal or the information conveyed with that signal. Of course, the output from the FM transmitter 34 is applied to a suitable transmitting antenna 36 for transmission in the usual manner well known in the art.

By employing the system shown in FIG. 1, coupon data may be transmitted as a subcarrier along with a standard FM broadcast, such as an FM radio broadcast. The coupon data may be transmitted periodically, i.e., once per day, once per week, etc. or may be continuously transmitted at regular intervals, i.e., once every fifteen minutes, depending upon the size and operation of the storage device or broadcast wheel 26.

Figure 4:
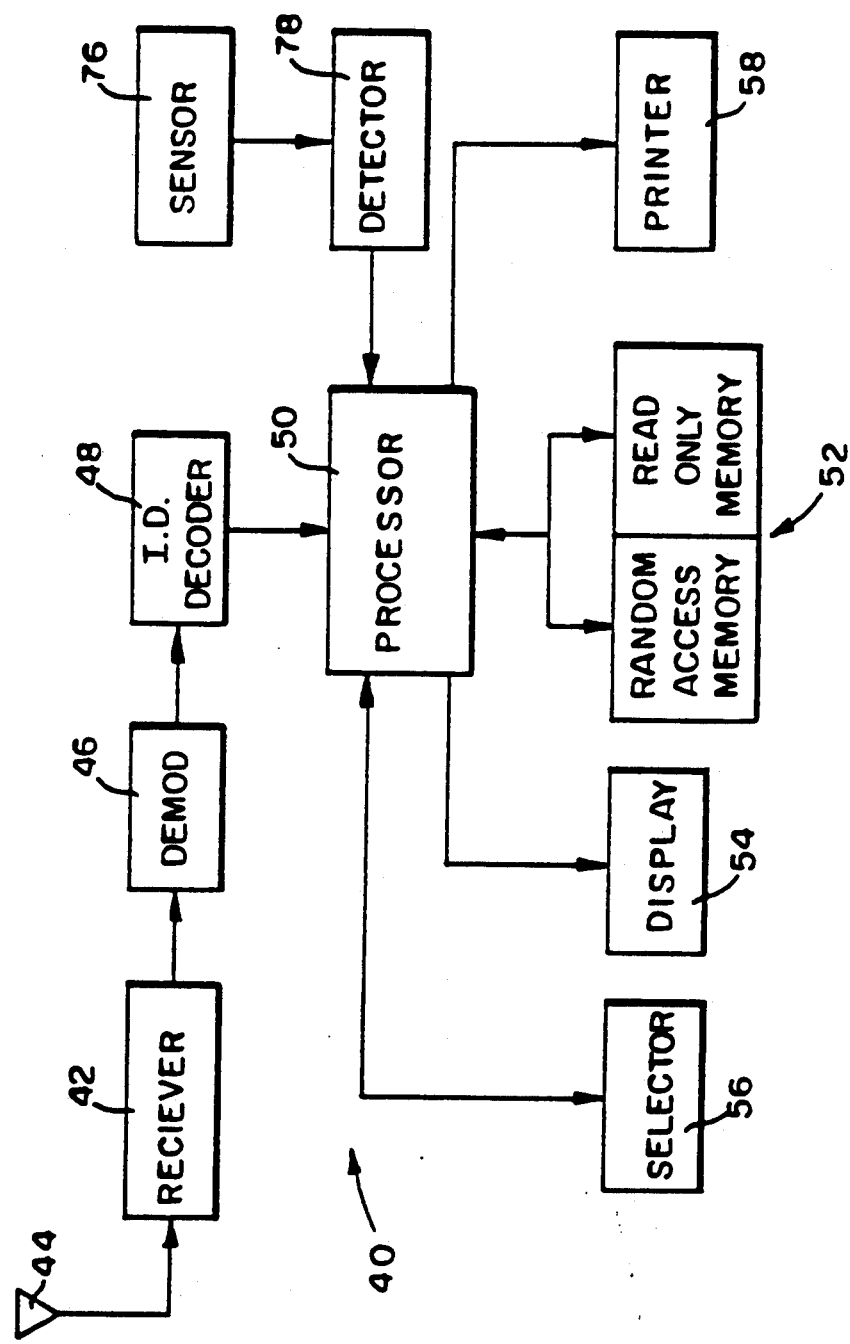
FIG. 4 is a functional block diagram of the receiver portion of a data delivery system in accordance with the present invention.

FIG. 4 is a functional block diagram of a second means, hereinafter referred to as the data decoding and printing device 40 in accordance with the present invention. The data decoding and printing device 40 is adapted to be located proximate a television receiver in the home, office or other facility of a user and is employed for receiving the FM broadcast signal, including the subcarrier, decoding the coupon data and for selectively printing a hard copy of the coupon when requested by the user. The device 40 includes an FM radio receiver 42 which is electrically connected to an FM antenna 44. In the presently preferred embodiment, the receiver 42 is a standard FM radio receiver which includes a detector (not shown) for detecting the subcarrier which contains the coupon data. Receivers of this type are commercially available from numerous manufacturers, including Sony and JVC. Complete details of the structure and operation of the receiver 42 are available from the manufacturer and are not necessary for a complete understanding of the present invention.

The output of the subcarrier detector portion of the receiver 42 is applied to a decoder or demodulator 46 which selectively detects the FSK tones which contain the coupon data and converts the tones back into a stream or series of digital logic signals. The decoder/demodulator 46 is also of a type well known in the art and commercially available from several manufacturers, including Motorola.

The output of the decoder/demodulator 46 is applied to an identification decoder 48 which detects or reads the first bit of each data word to identify the type of data within the word. Thereafter, the digital coupon data signals from each data word and the identification code are applied to a processor 50 and, utilizing the identification bit, are stored in predetermined locations within the random access memory portion of a memory module 52. The digital coupon data which is stored in the memory module 52 is in the same compacted or encoded form which it was in when it left the data entry device 12. However, the identification bit permits the processor 50 to identify the type of coupon data which has been received and stored by subject matter category. The coupon data which is stored in the memory module 52 is continuously updated as new coupon data is broadcast and received. The memory module 52 also includes a read only memory which contains a computer program which is employed to control the operation of the processor 50.

In order to properly synchronize and indicate the availability of a particular coupon with respect to a particular TV commercial being broadcast, enabling means are required. In the presently preferred embodiment, the system is employed for permitting the printing of a coupon concurrently with the broadcast of a particular television commercial. As previously described, the data pertaining to the coupon is broadcast on a periodic basis on a subcarrier of a standard FM radio broadcast signal. The data is received and, after decoding, is stored in the memory module 52 at the home or other facility of the user.

Figure 3:
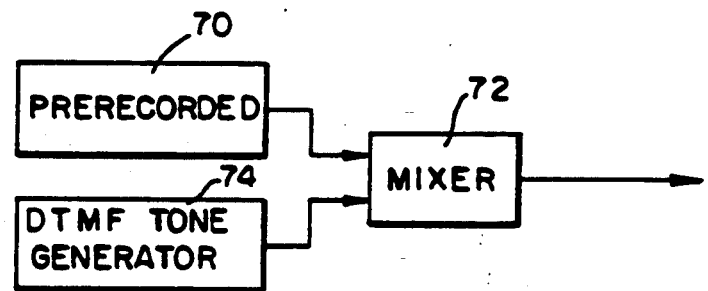
FIG. 3 is a functional block diagram of the cue tone generation portion of the data delivery system.

FIG. 3 illustrates a portion of the system 10 employed to synchronize the broadcast of the television commercial with the retrieval of the coupon data from the memory module 52. FIG. 3 illustrates a circuit for mixing within a mixer 72 a prerecorded television program 70, such as a television commercial, with an encoded enabling or cue code comprised of a plurality of DTMF tones. The DTMF tones employed to generate the cue code are generated by a DTMF tone generator 74 and each cue code is unique for the particular commercial. In the present embodiment, each cue code is comprised of four DTMF tones but a greater or lesser number of tones could be employed. The mixing of the signals results in a specific series of subaudible DTMF tones being placed within the audio track of the commercial so that every time the television commercial is broadcast the DTMF tones are simultaneously broadcast. The DTMF tones are preferably inserted at periodic, spaced intervals during the commercial. The DTMF tone generator 74 and the mixer 72 are preferably devices which are well known in the art and generally commercially available from several manufacturers, including Monroe Corp. A detailed description of each of these devices is available from the manufacturers and is not necessary for a complete understanding of the present invention.

Referring again to FIG. 4, the data decoding and printing device 40 further includes a sensor 76 which is adapted to receive audio signals from the television receiver (not shown). In the presently preferred embodiment, the sensor 76 is a microphone having a range which covers the frequency range of the DTMF cue tones. The output of the microphone 76 is fed to a detector 78 which detects the presence of the DTMF tones and generates an appropriate output digital signal indicative of the coupon data corresponding to the particular DTMF tones received. The output of the detector 78 is applied to the processor 50. In this manner, the output from the detector 78 provides a signal to the processor 50 to indicate to the processor when a television commercial corresponding to a particular coupon is being received. The processor 50 can then determine from the memory module 52 whether coupon data has been received and is being stored in the memory module 52 with respect to the particular commercial being broadcast. Assuming that the particular data has been received and has been stored in the memory module 52, the processor 50 sends a signal to a display device 54 to indicate to the user that coupon data corresponding to the particular television commercial has been received and stored and is available for printing. The display device 54 could be any type of standard display, such as a CRT, LED display, etc. but, preferably, comprises a series of separate indicators such as lights or LED's, one indicator for each type or class of coupon data which may be received and stored. Thus, for example, if data has been received and stored pertaining to a coupon for a particular detergent product being concurrently shown on the television screen, a particular display indicator light is lit on the display device 54. The purpose in utilizing a system of this type is that the user is then given an option as to whether the user wishes to actually decode and print the coupon data stored in the memory which corresponds to the particular television commercial. If the user wishes to obtain a hard copy of the coupon, the user provides a signal to the processor 50 utilizing a selector device 56. The selector device 56 could be any type of input device, such as a keyboard, etc. Preferably, the selector device 56 comprises a series of switches or pushbuttons (not shown), one button associated with each of the indicator lights on the display device 54 for simplicity.

Assuming that a user wishes to obtain a particular coupon which has been received and stored in the memory 52, activation of the appropriate pushbutton on the selector device 56 corresponding to a lit indicator light on the display device 54 causes the processor 50 to recall the corresponding coupon data from the memory module 52 utilizing the previously decoded identification bit. The encoded coupon data is then decoded utilizing the same code, data compaction or table lookup system used in the data entry device 12, and is sent to a printer device 58. The printer device 58 prints the hard copy of the coupon in human readable form as received from the processor 50. The processor 50 is of a type commercially available from, for example, Texas Instruments. The printer device 58 is also of a type commercially available from various manufacturers, including Seiko.

It will be appreciated by those skilled in the art that certain changes or improvements could be made to the above-identified system. For example, although television and radio signals are omnidirectionally broadcast, it may be that certain coupons are not applicable or are void in certain geographic areas. For example, if, due to governmental regulations, a particular coupon (i.e., for liquor) may only be used in certain jurisdictions or may not be used in certain other jurisdictions, it is possible to control the geographic area in which the coupon could be printed. One way of so controlling the system is to program the processor 50 to recognize certain identification codes. For example, the processor 50 may be programmed so that certain identification codes cannot be printed in its particular location and so, while data pertaining to a particular coupon would be received, the processor 50 would preclude the data from being stored in the memory modules or would preclude the signal from being sent to the user on the display device 54 to indicate the availability receipt of the coupon. Alternatively, the selector device 56 could be locked out for the particular coupon(s). The processor 50 may be so programmed on the basis of a particular zip code, state code, etc., or on the basis of the particular serial number of the data decoder and printer device 40.

From the foregoing description, it can be seen that the present invention comprises a method and apparatus for contemporaneous delivery of data over existing transmission facilities. It will be appreciated by those skilled in the art that changes and modifications may be made to the above-described embodiment without departing from the inventive concepts thereof. It is understood, therefore, that the present invention should not be limited to the particular embodiment disclosed, but should include all modifications and changes which are within the scope and spirit of the invention, as defined by the appended claims.

We claim:

1. A method for contemporaneous delivery of data from a first location to a user at a remote location utilizing standard broadcast facilities, the method comprising:

encoding the data and an identifier uniquely associated with the data into a data packet;

transmitting the data packet along with a first standard broadcast signal;

generating an enabling cue signal corresponding to the identifier;

encoding the cue signal and transmitting the encoded cue signal along with a second standard broadcast signal;

receiving and demodulating the first broadcast signal at the user location and decoding the identifier portion of the data packet;

storing the received encoded data in a memory uniquely associated with the decoded identifier at the user location;

receiving and demodulating the second broadcast signal at the user location and decoding the demodulated signal to provide the cue signal;

comparing the received cue signal with the received identifier and providing an indication to the user if the comparison is positive; and decoding and printing the stored, encoded data.

2. A system for the contemporaneous delivery of data from a first location to a user at a remote location utilizing standard broadcast facilities, the system comprising:

means at the first location for receiving the data and an identifier uniquely associated with the data and for encoding the data and the identifier into a data packet for transmission along with a first standard broadcast signal;

means for generating an enabling cue signal corresponding to the identifier and for encoding the cue signal for transmission along with a second standard broadcast signal;

means at the user location for receiving and demodulating the first broadcast signal, for decoding the identifier and for storing the received encoded data in a memory location uniquely associated with the identifier;

means at the user location cooperating with a standard broadcast receiver for receiving the demodulated second broadcast signal and for decoding the received signal to provide the cue signal;

means at the user location for receiving the cue signal, for determining the presence of stored data having an identifier corresponding to the cue signal and for providing an indication to the user of the presence of the stored data; and means at the user location for selectively decoding and printing the stored data upon actuation by the user.

3. The system as recited in claim 2 wherein the first standard broadcast signal is an FM radio signal.

4. The system as recited in claim 3 wherein the data packet is transmitted as a subcarrier of the standard FM radio broadcast signal.

5. The system as recited in claim 2 wherein the second broadcast signal is a standard television signal.

6. The system as recited in claim 2 wherein the means for generating and encoding the cue signal comprises a DTMF tone generator.

7. The system as recited in claim 6 wherein the means for receiving the modulated second broadcast signal and for decoding the received signal to provide the cue signal comprises an audio sensor and a detector for detecting the DTMF tones and for generating an electrical signal in response thereto.

8. The system as recited in claim 2 wherein the means for receiving and encoding the data and identifier comprises a programmed computer.

9. The system as recited in claim 2 wherein the means for providing an indication to the user of the presence of the stored data comprises a display device including a plurality of indicators, one indicator associated with each type of data which may be delivered by the system.

* * * * *